DOCUMENT HANDLING APPARATUS

Filed Aug. 14, 1963

2 Sheets-Sheet 1

INVENTOR.
YOW-JIUN HU
BY John V. Regan
Attorney

Jan. 25, 1966 YOW-JIUN HU 3,231,266

DOCUMENT HANDLING APPARATUS

Filed Aug. 14, 1963 2 Sheets-Sheet 2

INVENTOR.
YOW-JIUN HU
BY John V. Regan
Attorney 3,231,266

DOCUMENT HANDLING APPARATUS

Yow-Jiun Hu, Alexandria, Va., assignor to Radio Corporation of America, a corporation of Delaware Filed Aug. 14, 1963, Ser. No. 302,051
3 Claims. (Cl. 271—35)

This invention relates to document handling apparatus and, in particular, to apparatus for the controlled feeding of record cards out of an input station and through a work station, and for the generation of timing pulses that are synchronized with the movement of a card during transport.

Many present day card machines employ complex card feeding and transport mechanisms and elaborate means for generating timing pulses. These timing pulses are utilized to synchronize the recording of information on a card with the movements of the card, or to synchronize the operation of user equipment with the reading of information from a card. Consequently, it is important that these timing pulses be generated in synchronism with the movement and position of the card being transported.

In most present machines, the timing pulse generator is mechanically coupled with the card transport mechanism and driven synchronously therewith. One disadvantage of such a timing arrangement is that the generation of timing pulses is not necessarily related to the actual position of the card being transported. Any slippage of the card, backlash in the transport drive mechanism etc. may result in a loss of synchronism between actual card movement and the operation of the timing generator, with possible resulting loss of system synchronization and erroneous information transfer. Another disadvantage of such a timing arrangement is that the cards generally must be fed out of the supply hopper, or input station, at a precise time in the machine cycle.

It is an object of this invention to provide a document handling apparatus that does not have the disadvantages aforementioned.

It is a further object of this invention to provide an improved document handling apparatus in which the generation of timing signals is synchronized with the movement and position of the document itself.

It is still another object of this invention to provide an improved timing arrangement which includes a plurality of timing marks, apertures for example, movable past a sensing element in synchronism with the movement of a card being transported.

Briefly stated, the invention includes an endless belt having one or more picker elements mounted thereon for engaging a document in the supply hopper and for feeding it positively out of the supply hopper and through a work station. The belt may have a line of timing marks, apertures for example, having the same spacing as either the rows or columns of data storage positions on the document being transported. Inasmuch as the positions of both the timing marks and the document being transported are fixed with respect to the picker, they are fixed also relative to each other. Hence, the generation of timing pulses in response to the sensing of the timing marks always is synchronized with the actual movement and position of the document being transported.

According to the preferred form of the invention, means are provided for moving the endless belt in such a manner that a picker engages a document in the supply hopper at approximately zero velocity, thus avoiding damage to the document due to impact. The document may be transported through the work station either in one continuous motion, or in a series of incremental steps, depending upon the function of the work station. In the latter case, the drive means preferably operates with harmonic motion for driving the document without impact.

In the accompanying drawings, like components are identified by like reference characters; and FIGURE 1 is a view, in side elevation, of a document handling apparatus according to the invention;

Figure 4:
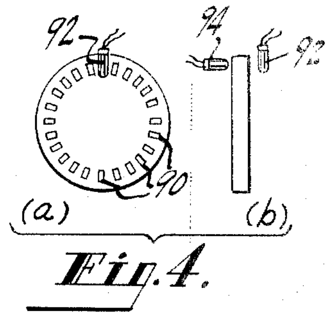
Figure 5:
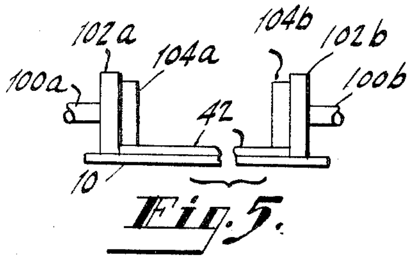
Figure 6:
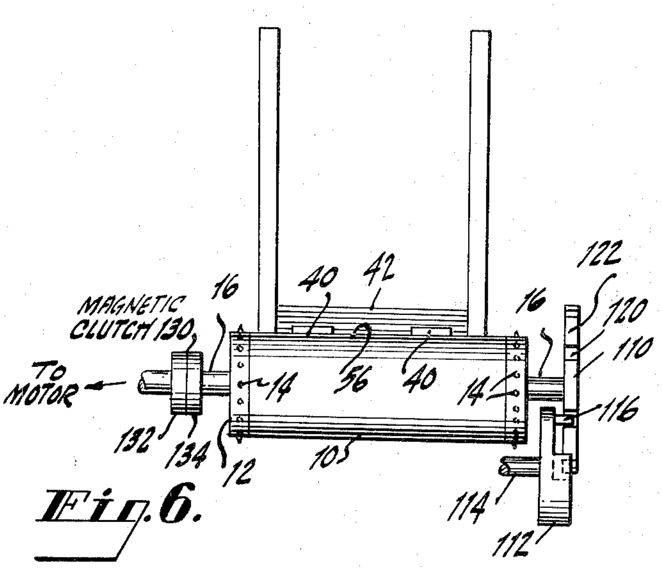
Figure 7:
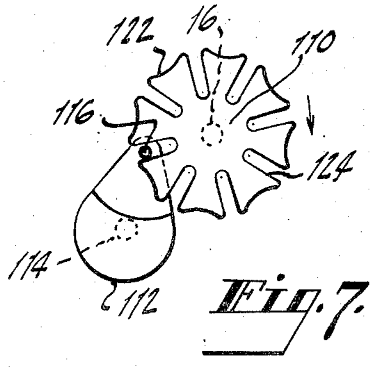
Figure 8:
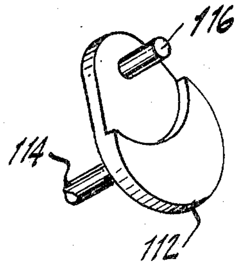

FIGURE 4(*a*) and FIGURE 4(*b*) are views in front and side elevation respectively, of another timing arrangement;

FIGURE 5 is a view, partially in section, of a document guide means;

FIGURE 6 is a view of the input supply hopper, endless belt and belt drive means in rear elevation;

FIGURE 7 is a view of a Geneva assembly which may be used to provide intermittent movement of the endless belt wtihout card impact; and FIGURE 8 is a perspective view of a pin wheel for driving the Geneva wheel.

The document handling apparatus to be described is particularly well suited for handling punched record cards, of the Hollerith type for example, and will be so described. It will be understood, however, that the system also is useful for handling other types of documents.

Figure 1:
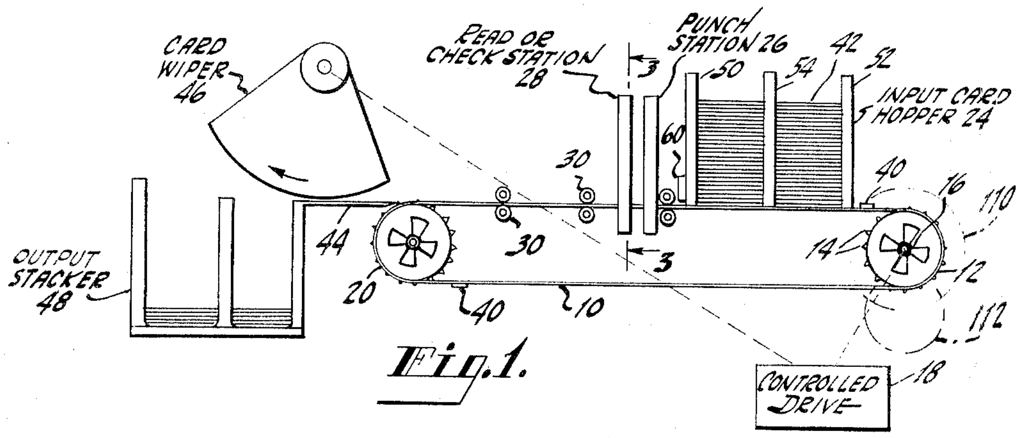

In FIGURE 1, an endless belt 10 having sprocket holes (FIGURE 2) is driven by a sprocket wheel 12. Wheel 12 has a number of sprocket teeth 14 spaced to mate with the sprocket holes in the belt 10. Wheel 12 has its shaft 16 mechanically coupled to a box labeled "controlled drive" 18, to be described. A second idler sprocket wheel 20 is driven by the belt as the belt, in turn, is driven by the sprocket wheel 12.

Belt 10 moves beneath an input card hopper 24 and through a punch station 26 and a reading station 28. In an actual application, either or both of the punch and read stations 26, 28 may be present, or there may be a different type of work station, depending upon the application. Belt 10 has a number of sets of picker elements 40, two shown mounted thereon and projecting from the belt. These pickers 40 are arranged to engage the trailing edge of the bottom one of the cards 42 in the input hopper 24, and to move the bottom card out of the hopper and through the work stations 26, 28. Pickers 40 provide the only means for moving the card being transported, and one set of the pickers 40 always is in contact with the trailing edge of the card throughout the transport thereof through the work station.

Positioned at the forward end of the apparatus, the left end as viewed in FIGURE 1, is a member 44 which strips the transported documents from the endles belt 10. A sector-shaped card wiper 46 is driven from the controlled drive means 18 and operates to move the card along member 44 and into an output stacker 48.

A number of sets of idler rollers 30 are provided for urging the transported card against the endless belt 10. The weight of the stack of cards 42 in input hopper 24 is effective in holding the transported card against belt 10 for a large portion of the travel of the card through the work stations. In addition, card guide means (FIGURE 5), which may be ones of the sets of idler rollers 30, are provided for assuring that the card being transported moves only in the desired direction.

The input hopper, or supply station, has a pair of upright standards 50 at the front corners, a pair of upright standards 52 at the rear corners and a pair of upright standards 54 at the sides. Input hopper 24 also has a bottom plate 56 (FIGURE 6) for supporting the stack of record cards 42. Located at the front of the hopper is a member 60, which may be mounted on the standards 50, spaced above the endless belt 10 to form a throat through which only one record card 42 may pass at any one time. The bottom plate 56 (FIGURE 6) has cutouts through which the pickers 40 project to engage the trailing edge of the bottom card 42. The height of the pickers 40 is such that the pickers engage only the bottom card in the hopper. As the bottom card is fed out from the hopper, the weight of the stack pushes the next card against the bottom plate 56 into position to be engaged by the next set of picker elements 40.

Figure 2:
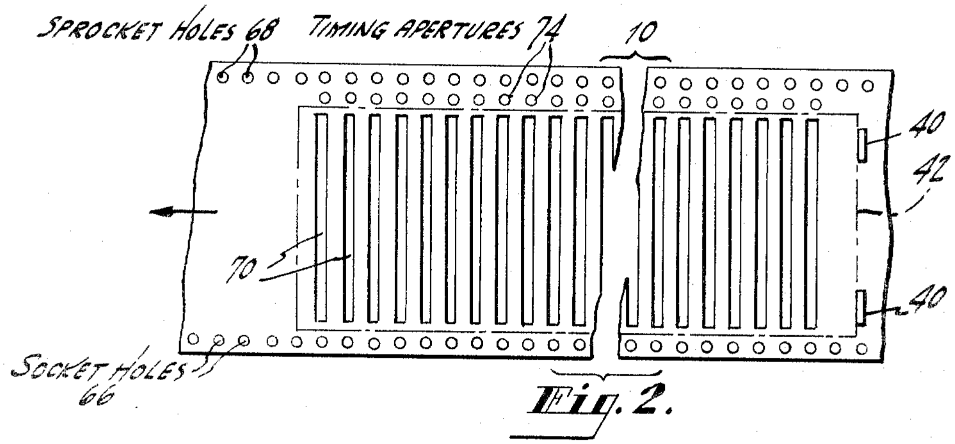
FIGURE 2 is a plan view of a portion of the endless belt and showing the positions of the timing marks and other features of the belt relative to a set of picker elements.

A section of the endless belt 10 is shown in plan view in FIGURE 2. Belt 10 has first and second sets of sprocket holes 66 and 68, which are engaged by the sprocket teeth 14 on the drive wheel 12. As shown in FIGURE 6, the drive wheel 12 has first and second sets of spaced sprocket teeth 14 for engagement with the two sets of sprocket holes 66 and 68. The particular form of the endless belt 10 may vary depending upon the particular functions to be performed at the work station. When the work station includes a punch station, endless belt 10 may be a thin web of stainless steel having a number of rectangular, or substantially rectangular, slots 70 through which the punch elements in station 26 may pass. On the other hand, if the apparatus has only a read station 28, the belt 10 may be transparent so that light may pass through the belt without any slots being required.

One well-known type of punched record card has eighty columns and twelve rows of data storage positions. The cards may be fed from the hopper 24 in a direction perpendicular to the card columns, so that an entire column of data storage positions is presented to the work station at one time. Alternatively, the cards may be fed in a direction perpendicular to the card rows, whereby an entire row of data storage positions is presented to the work station at one time. The number and spacing of the slots 70 in the belt depends upon the direction of card feed. If the card is fed column by column to the work station, then the belt would have eighty slots 70, one for each card column, spaced so that each slot 70 is positioned beneath a different one of the card columns when the trailing edge of the card is against the pickers 40. Accordingly, when information is being punched in any column of the card at the punch station 26, the selected punches may pass through the card and through the associated slot 70.

A card 42 is shown in dashed lines in FIGURE 2 overlying the slots 70. It will be noted that the trailing edge of the card abuts against the pickers 40. Inasmuch as both the card 42 and the slots 70 always have a fixed position relative to the picker elements 40, they always have the same position relative to each other. Belt 10 also may have a line of timing marks in the form of apertures, magnetic spots, projections or the like, for all of which the term "timing marks" is used here and in the appended claims in a generic sense. The timing marks are illustrated in FIGURE 2 as being apertures 74, each aperture 74 being aligned with a different one of the slots 70. Accordingly, these timing apertures 74 move at the same speed as the belt and the card 42, and the timing apertures 74 always are aligned with the columns of information on the card 42. Apertures 74 are used for timing purposes and are sensed, by means to be described, to generate timing pulses which always are synchronized with the position and actual movement of the card 42.

In FIGURE 2, the timing apertures 74 are shown as being aligned with the sprocket holes 66, 68 and having the same spacing. In such a case, either set of sprocket holes could be used as timing apertures. However, it will be remembered that the sprocket holes 66, 68 are present throughout the entire length of the endless belt 10 and, if these sprocket holes were used as timing apertures, timing pulses would be generated when a sprocket hole not in alignment with a card column was presented to the sensing means. Also, the sprocket holes 66, 68 may not necessarily have the same positions and spacing, as shown, in a particular application.

In FIGURE 1, both of the sprocket wheels 12 and 20 rotate in synchronism, and the angular position of each of these wheels 12, 20 bears a fixed relation to the positions of the picker elements 40. Because of the fact that the card 42 being transported has a fixed position relative to the pickers 40, the card position also has a fixed relation relative to the angular positions of the wheels 12 and 20. This fact makes possible the generation of timing pulses by the alternative means of a timing disk of the type shown in FIGURE 4. The disk may be mechanically coupled to either of the sprocket wheels 12, 20 and driven in synchronism therewith. Timing pulses generated by this means always are in synchronism with the actual movement and position of the record card being transported. The timing disk may have timing marks in the form of apertures or slots 90 which pass between a light source 92 and a photo-responsive pickup device 94. The slots 90 are spaced so that a different slot is positioned between the light source 92 and pickup device 94 as each different column of the card is presented to either the punch station 26 or read station 28.

Figure 3:
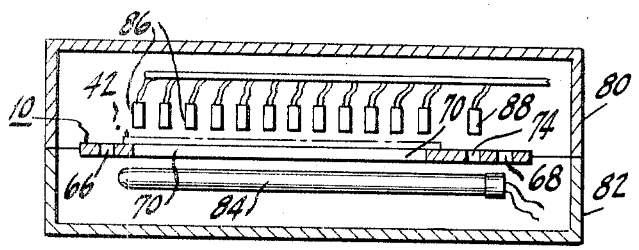
FIGURE 3 is an enlarged sectional view of a read station taken along the lines 3—3 of FIGURE 1.

FIGURE 3 is an elevation view of the read station 28 in cross-section, taken along the line 3—3 of FIGURE 1. Station 28 may include an upper housing section 80 and a lower housing section 82. These sections 80, 82 abut one another to form an enclosed housing which shields the light responsive elements in the station from ambient light. Belt 10 passes through the reading station between a light source 84 and a line of photo-responsive elements 86, there being an element 86 for each card row. When a column of data storage positions is present in the reader station, light from source 84 passes through the associated slot 70 in the belt and through any perforations in that card column to associated ones of the photo-responsive devices 86. The only photo-responsive devices 86 which receive light from source 84 are those positioned above perforations in the column of record card 42. However, light from source 84 always passes through the associated timing aperture 74 to a photo-responsive device 88 for the generation of timing pulses. As mentioned previously, the timing apertures 74 in the belt 10 always are aligned with the columns of the card, whereby photo-responsive device 88 receives a light input from source 84 each time a different column of the card is presented to the photo-responsive read elements 86.

The punch station 26, not shown in detail, has punch elements and a mating die block in place of the photo-responsive devices 86 and light source 84, respectively. The punch station may have a photo-responsive device, similar to the device 88 (FIGURE 3), for generating timing pulses, and an associated light source positioned beneath the belt 10.

One method which may be employed to hold the record card against the endless belt 10 and to prevent movement of the card in a direction perpendicular to the desired direction of card movement is illustrated in FIGURE 5. The card guide means comprises a pair of roller elements mounted on shafts 100*a*, 100*b*. The first guide means has a circular element 102*a* and a second circular element 104*a* of smaller diameter. The outer surface of elements 102*a* is in contact with the endless belt 10 and driven thereby. The guide means is positioned so that the smaller circular element 104*a* is in contact with the record card 24 being transported, and with the side surface of the larger element 102*a* forming a boundary or guide wall for the card 24. The second guide means is similar in construction and operation. Shafts 100*a*, 100*b* may be supported in bearings (not shown) journalled in the main frame of the machine.

When a card is to be perforated at the station 26, it is necessary in most cases, or at least desirable, that the card motion be interrupted after each new column is presented at the work station 26; and while the operation of perforating the card is being performed. This means that the card 42 is moved in a series of incremental steps, each step corresponding to the distance between the center lines of adjacent card columns. On the other hand, if a read operation only is to be performed, the card 42 to be read may be moved through the read station 28 in one continuous motion. In any event, however, it is desirable that the picker elements 40 engage the trailing edge of a card in the input hopper 24 at a very low speed in order that no damage occur to the card due to impact between the card and pickers 40. For intermittent movement of the card, harmonic drive motion is desirable, again to avoid impact of the pickers with the card. One illustrative example of suitable means for providing both of the types of card movement aforementioned is illustrated in FIGURE 6. Such drive means may be the "controlled drive" 18 of FIGURE 1.

At the right side of FIGURE 6 is a Geneva wheel 110 mounted on the shaft 16 of the sprocket wheel 12. Details of the Geneva wheel assembly are shown in FIGURES 7 and 8. This mechanism includes a pin wheel 112 mounted on a shaft 114 and carrying a pin 116 arranged to enter a slot 120 on the Geneva wheel. Pin 116 engages a segment 124 and causes the wheel 110 to move a short distance, with harmonic motion, as the pin 116 moves in and out of the slot 124. Thus, there is no impact of the pickers 40 with the trailing edge of the card.

Pin 116 enters a different slot 120 for each revolution of the pin wheel 112 and rotates the Geneva wheel a predetermined amount during each revolution. An arc surface 122 engages the pin wheel 112 and prevents movement of the Geneva wheel 110 when the wheel is not being driven. The number and spacing of the slots 120, and the relative positions and sizes of the wheels 110 and 112, are chosen so that the endless belt 10 is moved a distance corresponding to the spacing between center lines of adjacent card columns for each revolution of the pin wheel 112.

The Geneva wheel 110 is driven by the pin 116 only for a small fraction of the time it takes the pin wheel 112 to rotate through 360°. The card being transported is moved during this small portion of the cycle, and the remaining portion of the cycle is available for the punching operation, if one is to be performed. The punch station 26 may be located relative to the input hopper 24 so that, for two different ones of the stationary positions of the belt 10, a different set of the pickers 40 comes to reset against the trailing edge of the bottom card in the input hopper, thereby avoiding impact between the pickers 40 and the card.

Located at the left hand side of FIGURE 6 and mounted on the shaft 16 is a magnetic clutch 130 having elements 132 and 134. Element 132 is mechanically coupled to a motor (not shown) and continuously driven by the motor. When a read operation only is to be performed, the endless belt 10 is first driven by the ratchet and pawl arrangement until the card is engaged by a set of pickers 40 and moved at least partially out of the hopper 24. The magnetic clutch 130 then may be engaged to feed the card through the read station at high speed in one continuous motion. If desired, the pin wheel 112 may be stopped at that time with the pin 116 out of engagement with the Geneva wheel 110. Magnetic clutch 130 is disengaged after the card is fed through the read station, and the pin wheel 112 then is rotated again a number of times until the next card in the hopper 24 is engaged by the pickers 40 and moved at least partly out of the hopper.

What is claimed is:

1. The combination comprising:
a document input station for holding a document having N lines of data storage positions;
a document work station;
an endless belt having a portion movable past said input station and said work station in a plane parallel to the document in said input station and in a direction orthogonal to said lines of data storage positions;
a picker element projecting from said belt for engaging an edge of said document in said input station and for positively feeding said document out of said input station and to said work station;
N timing marks carried by said belt and being located relative to said picker element so that each mark is aligned with a different one of the lines of data storage positions on the document being transported;
and means for sensing said timing marks.

2. The combination comprising:
a document input hopper for holding a document having N parallel lines of data storage positions;
a document work station;
an endless belt having a portion movable past said hopper and said station in a plane parallel to the plane of said document and in a direction orthogonal to said lines of data storage positions;
a picker element projecting from said belt for engaging an edge of said document in the hopper and for positively moving said document out of said hopper and through said work station;
N timing marks carried by said belt, said marks being spaced along said belt in the direction of belt movement and having the same relative spacing as said lines of data storage positions;
and means for sensing said timing marks.

3. The combination comprising:
a document input station for holding a document having N lines of data storage positions;
a document work station;
an endless belt having a portion movable past said input station and said work station in a plane parallel to said document and in a direction orthogonal to said lines of data storage positions;
a picker element projecting from said belt for engaging the document in said input station and for moving it out of said input station and to said work station;
means imparting harmonic drive motion to said belt;
means urging said document against said belt;
N timing marks spaced along said belt, in the direction of belt movement, with the same spacing as said lines of data storage positions;
and means for sensing said timing marks.

References Cited by the Examiner

UNITED STATES PATENTS

| | | | |
|---|---|---|---|
| 1,653,838 | 12/1927 | Buttner | 271—3 |
| 2,061,546 | 11/1936 | Bryson | 271—35 X |
| 2,653,508 | 9/1953 | Whiteley | 226—32 X |
| 2,828,001 | 3/1958 | Bornemann | 198—131 |
| 2,931,646 | 4/1960 | Davis | 271—10 |
| 3,097,745 | 7/1963 | Leo | 209—111.5 |

M. HENSON, WOOD, Jr., *Primary Examiner.*

ROBERT B. REEVES, *Examiner.*